US010394880B2

(12) United States Patent
Bugir et al.

(10) Patent No.: US 10,394,880 B2
(45) Date of Patent: Aug. 27, 2019

(54) SYSTEM, METHODS, AND PROGRAM PRODUCT TO TRACE CONTENT GENEALOGY

(71) Applicant: IMAGINE COMMUNICATIONS CORP., Frisco, TX (US)

(72) Inventors: Taras Markian Bugir, Golden, CO (US); Cynthia Parrish, Littleton, CO (US); Candace Helgerson, Denver, CO (US)

(73) Assignee: IMAGINE COMMUNICATIONS CORP., Frisco, TX (US)

( * ) Notice: Subject to any disclaimer, the term of this patent is extended or adjusted under 35 U.S.C. 154(b) by 0 days.

(21) Appl. No.: 15/490,649

(22) Filed: Apr. 18, 2017

(65) Prior Publication Data

US 2017/0351671 A1    Dec. 7, 2017

Related U.S. Application Data

(63) Continuation of application No. 11/305,871, filed on Dec. 16, 2005, now Pat. No. 9,626,366.

(60) Provisional application No. 60/712,051, filed on Aug. 29, 2005.

(51) Int. Cl.
    *G06F 16/00*   (2019.01)
    *G06F 16/48*   (2019.01)

(52) U.S. Cl.
    CPC .................... *G06F 16/48* (2019.01)

(58) Field of Classification Search
    CPC ........................................ G06F 16/48
    See application file for complete search history.

(56) References Cited

U.S. PATENT DOCUMENTS 7,739,597 B2* 6/2010 Wong ............... G06F 17/30017
                                                  715/717
2003/0088573 A1* 5/2003 Stickler ........... G06F 17/30867

* cited by examiner

*Primary Examiner* — Paul Kim
(74) *Attorney, Agent, or Firm* — Tarolli, Sundheim, Covell & Tummino LLP

(57) ABSTRACT

Embodiments of systems, program products, and methods to manage content and distribution of media are provided. An embodiment of a system, for example, can include a communication network for transmitting media files, a content management server having a processor and memory coupled to the processor, a database accessible to the processor of the content management server and including media files associated with metadata records, a plurality of content management developer computers to provide content management developers with online access over the communication network to the media files and associated metadata records to thereby edit the metadata records, a plurality of user computers accessible to the communication network to provide the users with access to the media files over the communication network to thereby view and edit at least portions of respective metadata records. The system also includes content management program product stored in the memory of the content management server to manage content and distribution of media.

19 Claims, 9 Drawing Sheets

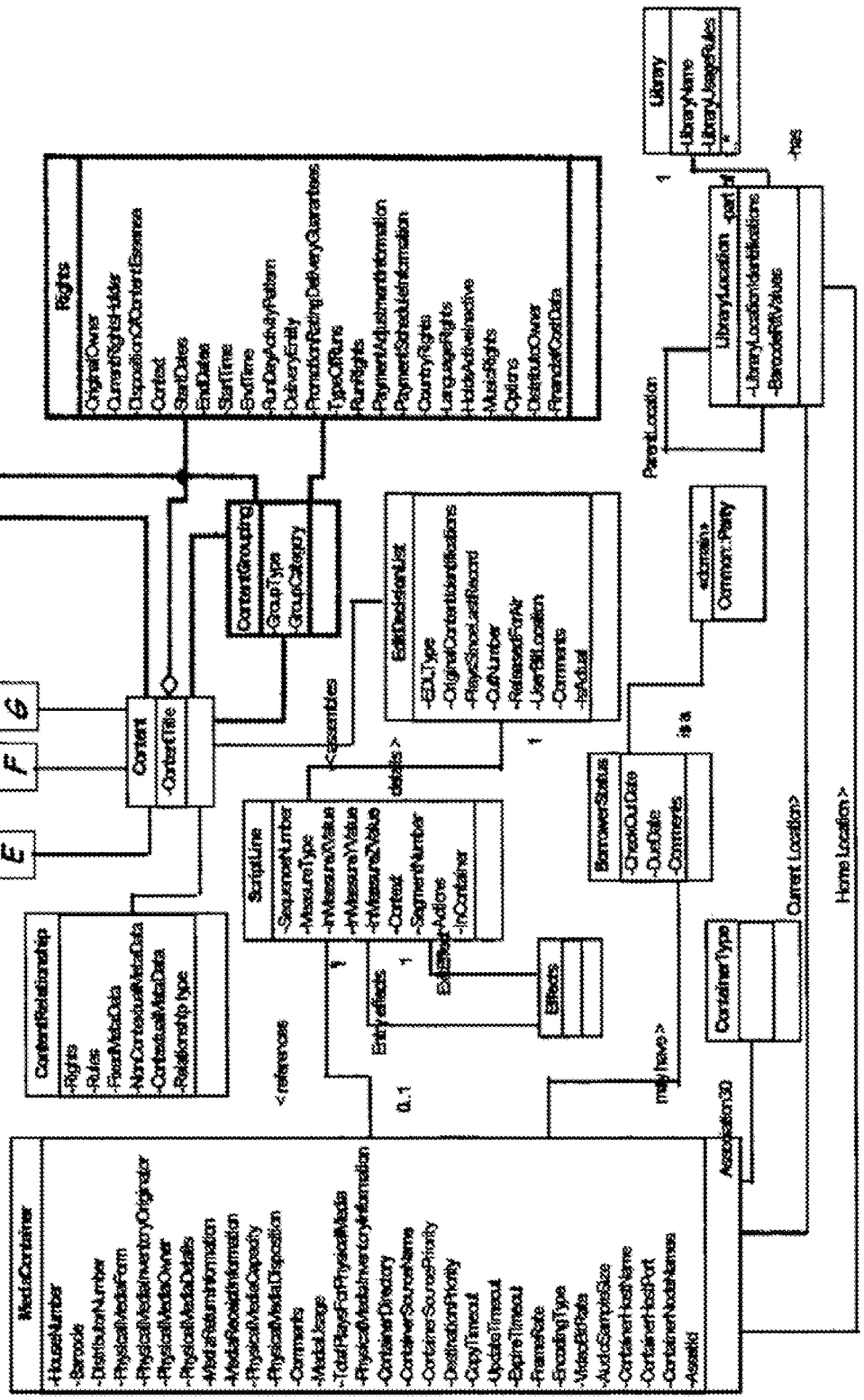

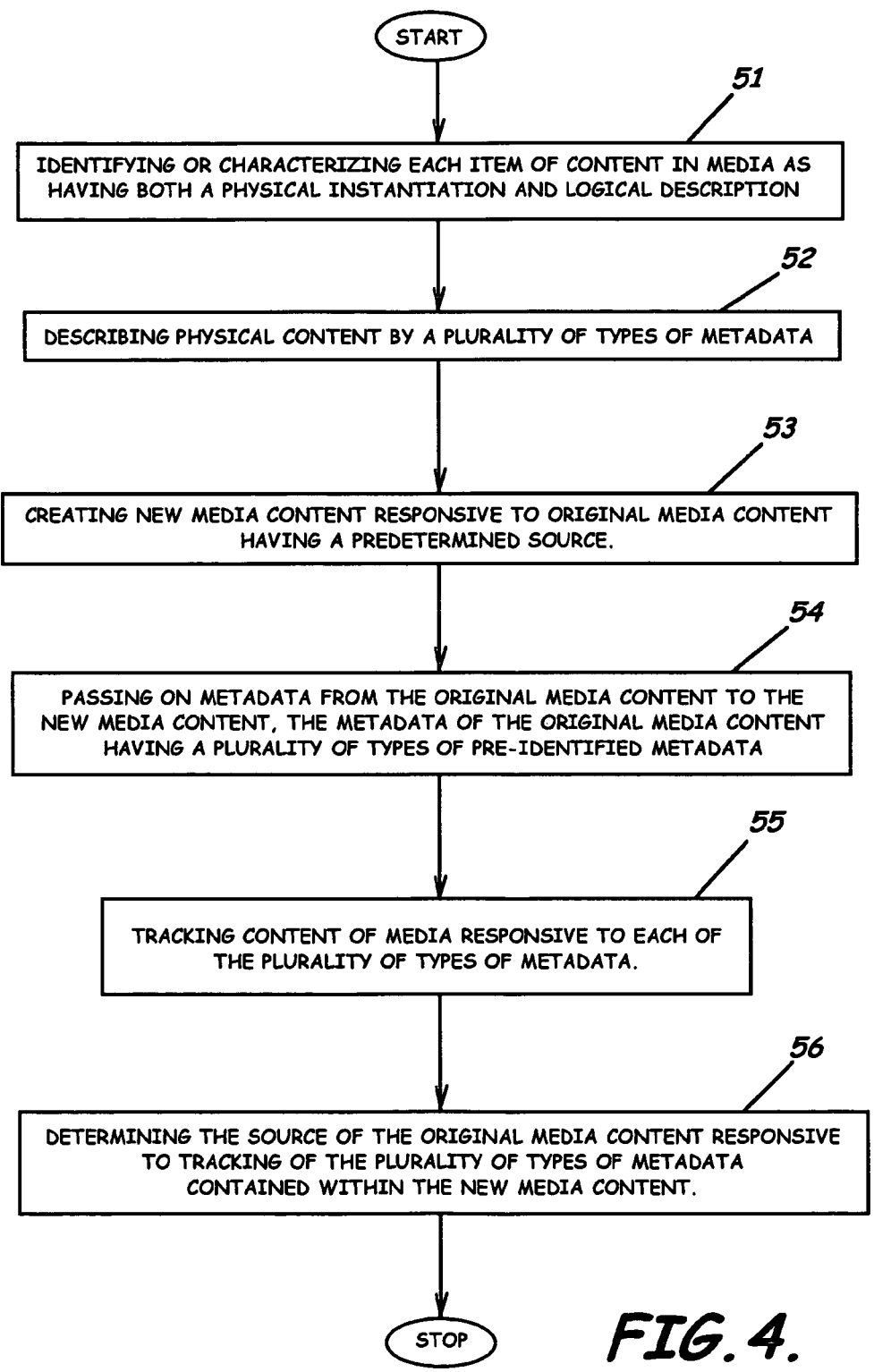

SYSTEM, METHODS, AND PROGRAM PRODUCT TO TRACE CONTENT GENEALOGY

RELATED APPLICATIONS

This application is a continuation of U.S. patent application Ser. No. 11/305,871, Filed Dec. 16, 2005, entitled SYSTEM, METHODS, AND PROGRAM PRODUCT TO TRACE CONTENT GENEALOGY, which claims priority and benefit to U.S. Provisional Patent Application No. 60/712,051, now U.S. Pat. No. 9,626,366, which is incorporated herein by reference in its entirety. This invention also is related to U.S. Provisional Patent Application No. 60/711,699, by Bugir et al, titled "System, Program Product, and Methods to Enhance Media Content Management," filed on Aug. 26, 2005, incorporated by reference herein in its entirety, U.S. Provisional Patent Application No. 60/711,700, by Bugir, et al, titled "System, Methods, and Program Product To Trace Content Genealogy" filed on Aug. 26, 2005, U.S. Provisional Patent Application No. 60/712,052, by Bugir et al, titled "System, Program Product, and Methods to Enhance Media Content Management," filed on Aug. 29, 2005, incorporated by reference herein in its entirety, U.S. Provisional Patent Application No. 60/715,664 by Bugir, et al., titled "System, Program, Product, and Methods to Enhance Media Content Management," filed on Sep. 8, 2005, incorporated herein by reference herein in its entirety. U.S. Non-Provisional patent application Ser. No. 11/305, 852, now U.S. Pat. No. 8,250,051, by Bugir et al., titled "System, Program Product, and Methods to Enhance Media Content Management," filed on Dec. 16, 2005, incorporated by reference herein in its entirety, U.S. Non-Provisional patent application Ser. No. 11/305,870, now abandoned, by Bugir et al, titled "System, Program Product, and Methods to Enhance Media Content Management," filed on Dec. 16, 2005, incorporated by reference herein in its entirety, and U.S. Non-Provisional patent application Ser. No. 11/305, 873, now abandoned, by Bugir, et al., titled "System, Program, Product, and Methods to Trace Content Genealogy", filed on Dec. 16, 2005, incorporated herein by reference in its entirety, and U.S. Non-Provisional patent application Ser. No. 11/305,872, now U.S. Pat. No. 7,693,897, by Bugir, et al., titled "System, Program Product, and Methods to Enhance Media Content Management", filed on Dec. 16, 2005, incorporated herein by reference in its entirety.

BACKGROUND OF THE INVENTION

1. Field of the Invention

This invention relates to the media industry and, more particularly to tracking of content in the media industry, and more specifically, enhanced systems, program products, and methods to manage media content.

2. Description of Related Art

The media industry is experiencing a profound business disruption due to the change from analog to digital business practices. This, for example, has led to a radical re-evaluation of current media management business processes, particularly in relation to the proliferation of channels, consumer devices, delivery mechanisms and rights management. Technology has moved to digital distribution of media which can be readily copied and distributed. Authors of content need to protect their intellectual property. Equally, owners of physical property need to protect their rights. For many years, content product has relied upon physical media to contain content. If the media was secure, so were its contents. As content becomes digitized, it can be duplicated with minimal effort. Although much emphasis has been placed upon digital rights management to secure content, very little emphasis has been placed upon "derived content," i.e., content that has been repurposed along with other content to produce new content.

Recently, digital content store systems and metadata store systems have been developed which allow some level of control over media content, e.g., songs (music and lyrics), documents, and video. Some of these systems also associate metadata with labels unrelated to content and location of the content. Such systems, however, often provide control over content in media by key codes or authorization codes to allow access to only paid users or have a preselected time frame for expiration of rights or have expiration rights upon preselected number of uses.

SUMMARY OF THE INVENTION

In view of the foregoing, advantageously, embodiments of the present invention provide systems, program products and methods of content management such as tracing content genealogy in the media industry (e.g., film, photos, footage, documents, text). Embodiments of the present invention can support integrating applications across the digital supply chain with the common thread of metadata linking business functions with operational mandates, enabling business agility for enhanced productivity in the rapidly changing media landscape, while simultaneously lowering total cost of ownership and creating new revenue opportunities. Embodiments of the invention advantageously further provide systems, program product and methods of integrating many disparate media business processes into a modular system that can move content through the broadcast workflow in a consistent and intelligent fashion by interpreting and acting upon the metadata associated with the content.

Embodiments of the present invention, for example, can allow tracking or tracing the source of content to its root parentage through a "genetic-type relationship" and thereby ascertain the associated rights, fiscal obligations, and usage with reference to contracts. Embodiments of the systems, program products, and methods can identify or characterize each item of content as having both a physical instantiation as well as a logical description, whereby physical content can be described by its metadata, and which can have a plurality of metadata types, for example: core metadata, applied metadata, and contextual metadata. Digital formats provide non-linear access to content and that such content usually requires editing, compiling and dubbing to produce derived content for repurposing in different countries, on different mediums and on different platforms. Thus, advantageously, embodiments of the present invention provide systems, program products, and methods that allow content to trace its familial lineage.

More specifically, embodiments of the present invention provide a system to manage content and distribution of media through, for example, tracking and/or tracing of genealogy of content media. For example, according to an embodiment of the present invention a system to manage content and distribution of media includes a communication network for transmitting media files and at least one computer accessible to the communication network to define a content management server. The content management server has a processor and memory coupled to the processor to store operating instructions therein. The system also includes a database accessible to the processor of the content management server including media files associated with metadata records such as, for example, core metadata records, applied metadata records, and contextual metadata records.

The system can also include a plurality of content management developer computers each positioned remote from the content management server and accessible to the communication network. Each content management developer computer can have a processor, memory coupled to the processor to store operating instructions therein and to receive media files, a display in communication with the processor to display metadata, and a user interface in communication with the processor, to provide each of a corresponding plurality of content management developers with online access over the communication network to the media files and associated metadata records to thereby edit metadata rules and rights.

The system can also include a plurality of user computers each positioned at a respective plurality of user sites remote from the content management server and accessible to the communication network and having a processor and memory coupled to the processor to store operating instructions therein and to receive media files, a display in communication with the processor to display metadata associated with the media files, and a user interface in communication with the processor to provide the respective user with access to the media files over the communication network to thereby view and edit at least portions of respective metadata records. Such users, often referred to as actors, can include various departments within various entities including, for example, the programming department, business department, sales department, traffic department, research department, and librarians (content storage department).

The system, for example, can also include content management program product stored in the memory of the content management server to manage content and distribution of media. The content management program product can include instructions to perform the operations of receiving a metadata record for a media file responsive to user input to thereby associate metadata to the media file, receiving a request from a user to modify the metadata record for the media file, determining an identity of the user to thereby determine if the user has pre-established permissions, modifying the metadata record for the media file responsive to user input and responsive to determining the user has pre-established permissions, and providing current auditing of changes to the metadata. Advantageously, auditing of changes to the metadata can include tracking modified metadata fields with a date and time stamp and tracking deletions of portions of the metadata. The content management program product can also include instructions to perform the operation of providing a parameter area within the form to create logical content settings for the metadata. Where the metadata is logical content metadata, the instructions to perform the operation of receiving the logical content metadata can further include importing the logical content metadata from a delivery-service provider, if desired.

According to embodiments of the present invention, the content management program product can include instructions to perform the operation of creating one or more additional copies of the metadata record. Performing such operation can include receiving a request to access a copy function, providing a copy form including an input field for entering a number of copies, an input field for entering a numbering scheme, e.g., advance each copy by 1 or 0, an input field for entering media attribute data, e.g., a title type for the copy such as episode, movie title, production order, or the field can be left blank. The operations can also include displaying the copy values selected by the user for review or modification by the user, and displaying a selection of the metadata value categories to copy. Each category value that will be copied can be displayed as the user selects the category. The copy value categories can include core metadata, applied metadata, contextual metadata, all metadata, relationships, physical, cross-references, and rules and rights, with the core category set as the default copy value. The relationships can include associative relationships, e.g., episodes and sequels, and genetic relationships, e.g., parent-child, grandparent-parent, and "kissing cousins."

According an embodiment of the present invention, the core value cannot be deselected as it is established to provide the minimum amount of metadata that can be copied. The content management program product can further include instructions to perform the operation of restricting access to values within each of value category so that the user can select all eligible values or no values. This prevents the user from picking values to copy from within a category. For example, if the user selects a category, according to this embodiment of the present invention, all eligible values are displayed for the copy procedure. The selection however, allows the copying of all eligible or no values from within each category. Further, according to an embodiment of the present invention, the system does not copy identifying (key) values such as a material identification number that makes the record uniquely identifiable in the system. This field is copied as a blank and the user must key the value(s) or create the value for each one of the copied records, separately. Further, according to an embodiment of the present invention, only eligible values in each selected category can be copied. For example, if the data is an original piece of content and is not being derived from one or more parents then there are no existing genetic relationships that can be copied. According to an embodiment of the present invention, ineligible categories visually displayed can be different such as grayed out (inactive) so user cannot select to copy them. Correspondingly, categories such as relationships, physical, cross-references, and rights-rules can be set so they are not able to be chosen to be copied and can be displayed as inactive if they are not relevant to a particular copy procedure. Further, the user may not be able to copy genetic relationships.

Advantageously, embodiments of the present invention also include methods to manage content and distribution of media. For example, according to an embodiment of the present invention, a method of determining media content genealogy includes the steps of identifying or characterizing each item of content in media as having both a physical instantiation and logical description, describing physical content by a plurality of types of metadata, creating new media content responsive to original media content having a predetermined source, and passing on metadata from the original media content to the new media content. The metadata of the original media content has, for example, a plurality of types of pre-identified metadata. The method can also include tracking content of media responsive to each of the plurality of types of metadata, determining the source of the original media content responsive to tracking of the plurality of types of metadata contained within the new media content, and characterizing the types of metadata and preserving metadata types responsive to preselected preservation instructions. According to another embodiment of the present invention, a method of creating and tracking media content genealogy can include repurposing content media responsive to a plurality of portions of media content, the content metadata including a plurality of pre-identified types of metadata, combining content metadata from each of the plurality of portions of media content, preserving at least one of the pre-identified types of metadata responsive to preselected preservation instructions during the combining step, and tracking the plurality of pre-identified types of metadata in the repurposed content to thereby identify potential rights of owners of the plurality of portions of media content.

According to another embodiment of the present invention, a method of tracking media content genealogy can include identifying or characterizing each item of content in media as having both a physical instantiation and logical description, describing physical content by a plurality of types of metadata, and tracking content of media responsive to each of the plurality of types of metadata.

According to yet another embodiment of the present invention, a method of creating and determining media content genealogy can include creating new media content responsive to original media content having a predetermined source and passing on metadata from the original media content to the new media content. The metadata of the original media content has a plurality of types of pre-identified metadata. The method can also include determining the source of the original media content responsive to tracking of the plurality of types of metadata contained within the new media content.

Advantageously, embodiments of the present invention also include a computer readable medium to manage content and distribution of media. For example, according to an embodiment of the present invention, a computer readable medium that is readable by a computer managing content and distribution of media is provided. The computer readable medium includes a set of instructions that, when executed by the computer, cause the computer to perform the operations of receiving a metadata record for a media file responsive to user input to thereby associate metadata to the media file, receiving a request from a user to modify the metadata record for the media file, determining an identity of the user to thereby determine if the user has pre-established permissions, modifying the metadata record for the media file responsive to user input and responsive to determining the user has pre-established permissions, and providing current auditing of changes to the metadata. Providing auditing can further include the operations of tracking modified metadata fields with a date and time stamp and tracking deletions of portions of the metadata. Further, the computer readable medium can include instructions to perform the operation of providing a parameter area within the form to create logical content settings for themetadata.

According to an embodiment of the present invention, the computer readable medium can also include instructions to perform the operation of creating one or more additional copies of the metadata record. Advantageously, this can be accomplished by performing the operations of receiving a request to access a copy function and providing a copy form including an input field for entering a number of copies, an input field for entering a numbering scheme, and an input field for entering media attribute data. The operations can also include those of displaying the copy values selected by the user for review or modification by the user and displaying a selection of the metadata value categories to copy.

According to an embodiment of the present invention, a computer readable medium that is readable by a computer managing content and distribution of media can include a set of instructions that, when executed by the computer, cause the computer to perform the operations of characterizing each item of content in media as having both a physical instantiation and logical description, describing physical content by a plurality of types of metadata, characterizing the types of metadata and preserving metadata types responsive to preselected preservation instruction, creating new media content responsive to original media content having a predetermined source, passing on metadata from the original media content to the new media content, the metadata of the original media content having a plurality of types of pre-identified metadata, tracking content of media responsive to each of the plurality of types of metadata, and determining the source of the original media content responsive to tracking of the plurality of types of metadata contained within the new media content.

According to an embodiment of the present invention, a computer readable medium that is readable by a computer managing content and distribution of media can include a set of instructions that when executed by the computer cause the computer to perform the operations of repurposing content media responsive to a plurality of portions of media content, the content metadata including a plurality of pre-identified types of metadata, combining content metadata from each of the plurality of portions of media content, preserving at least one of the pre-identified types of metadata responsive to preselected preservation instructions during the combining step, and tracking the plurality of pre-identified types of metadata in the repurposed content to thereby identify potential rights of owners of the plurality of portions of media content.

Media and entertainment companies often desire to achieve more acute control over their content in order to protect the intellectual property rights of the owner, enable complete and accurate billing for the use of content in commercial applications, deliver to the appropriate consumer appliance, and ensure quality of service. Advantageously, embodiments of the present invention can provide a content delivery platform for moving and managing content from the time it is created to the time it is distributed to multiple consumer devices, which can support workflow efficiency and new service provisioning for broadcasters and content providers.

Embodiments of the invention advantageously further provide a delivery platform that is a scalable, standards-based, enterprise-class platform that supports a highly integrated set of software applications. Through intelligent use of metadata, a delivery platform provides a layer of intelligence that enables media and entertainment companies to automatically transfer content with associated business rules for greater efficiencies, assured transactions and increased profitability. Embodiments of the inventions advantageously further provide revenue-generating services such as mobile video, IPTV, high-definition (HD) television and video-on-demand. Advantageously, embodiments of the present invention provide the ability to manage and transport content from ingest (receiving logical or physical content data) to consumption via multiple, simultaneous multi-format delivery streams delivering content to different receiving devices such as personal digital assistants (PDAs), mobile phones and personal computers (PCs).

Multiple and distinct stages in the broadcast workflow exist, including media ingest, play-out automation and transport. Embodiments of the inventions advantageously further can provide for sharing traffic, billing, and program scheduling rules with these applications as content moves through the digital media supply chain. Embodiments of the present invention support: integration of the current "physical" world of tapes and libraries with digital business; multiple, simultaneous multi-format delivery streams; transport of metadata down- and up-stream in the workflow process; integrated cross-departmental workflows; and dynamic changes to an active program schedule. Embodiments of the present invention can reside on, and interact with, a rich service layer to facilitate database abstraction, secure routing of content, and most importantly, meaningful business transactions. Advantageously, such service layers, for example, can include Database Services, Workflow Services, Platform Services and Open Services. Embodiments of the present invention can advantageously support applications such as, for example, Media Business Systems, Digital Asset Management, Media Ingest, Play-out Automation and Intelligent Transport, allowing an operator's business to be integrated and scaled across the various hardware systems throughout the network, and making it possible for service, software, content and hardware providers to integrate to the system.

For example, a user can enter metadata before or after ingesting the physical essence. As such, the user can revise and/or add additional metadata at any time. Further, a user can enter in one record at a time and generate copies or clones to save key strokes. Advantageously, security can be pre-established to identify the users that can add/change/delete/modify logical content (metadata). Advantageously, the system can provide current auditing such that as information is changed in the system the fields that change can be tracked with date/time stamps, and as information is deleted from the system there can be a tracking of these deletes. Further, a "reference" or "parameter" area can be provided to create logical content settings, lists, or other parameters. Logical content (metadata) can be either keyed in or imported from a delivery-service provider. Advantageously, the generic mechanisms for tracking embedded rights in content suggest that it has applicability in many industry verticals where rights and associated financial transactions require transactional management.

BRIEF DESCRIPTION OF THE DRAWINGS

So that the manner in which the features, benefits and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and, therefore, are not to be considered limiting of the invention's scope as it may include other effective embodiments as well.

FIGS. 3A and 3B are a schematic diagram of an object model of according to an embodiment of the present invention;

FIG. 4 is a flow diagram of a method of managing content and distribution of media according to an embodiment of the present invention;

DETAILED DESCRIPTION

Figure 1:
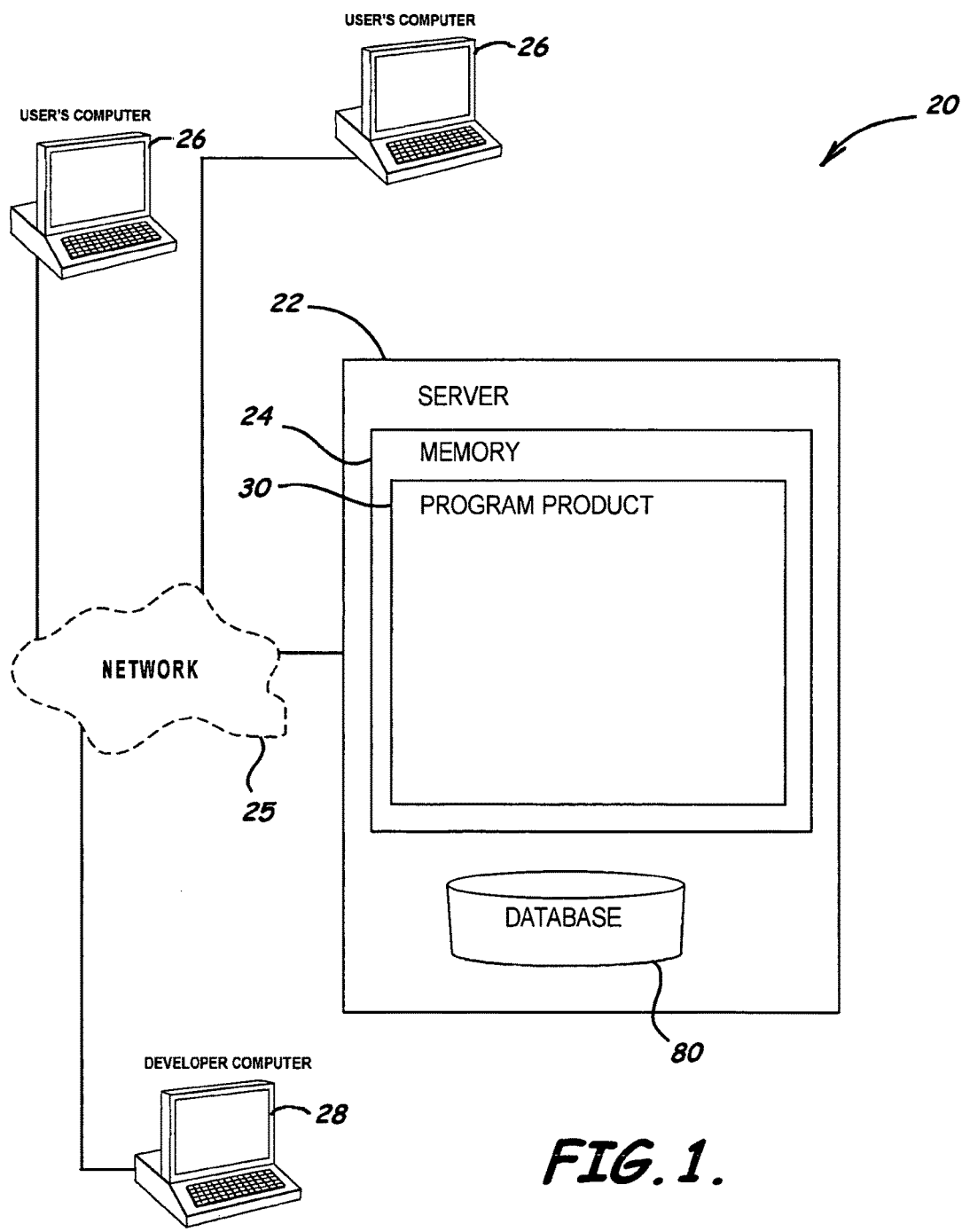
FIG. 1 is a schematic diagram of a system to manage content and distribution of media according to an embodiment of the present invention.

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As shown in FIGS. 1-7, a system 20 is provided which generally includes a communication network 25 for transmitting media files or data, a content management server 22 having a processor and memory 24 coupled to the processor, a database 80 accessible to the processor of the content management server 22 and including media files associated with metadata records, content management program product stored in the memory 24 of the content management server to manage content and distribution of media, and a plurality of content management developer computers and other user computers 26, 28, to provide such users with online access over the communication network 25. Note, metadata defines data and provides information about or documentation of other data managed within an application or environment. Metadata can include descriptive information about the context, quality and condition or characteristics of the data.

Embodiments of the systems, program products, and methods can identify or characterize each item of content as having both a physical instantiation as well as a logical description. Physical content can be described by its metadata and can have a plurality of metadata types, e.g., three: core metadata, applied metadata, and contextual metadata. Core metadata is considered intrinsic data, generally created by the producer of the content, with attributes that tend to be static after ingest to the system. Examples of this would be films like, "Gone With The Wind" which would likely always have Vivien Leigh as Scarlett O'Hare. Such core will not change no matter how many times the media is edited, modified, or content is repurposed. Applied metadata is variable data, generated by the rights holder, with attributes that identify usage and operational data. Examples include the duration and the number of break cuts that have been edited to create a television movie length version of "Gone With The Wind." Contextual metadata is usage-specific data that provides required information for various environments (regulatory, medium, etc.). Examples would be this particular version of "Gone With The Wind" has had its aspect ratio and compression modified for handheld PDA usage and has been edited to comply with regulatory conditions for cellular usage in Canada.

Based on these distinctions (as well as other possible distinctions), for example Uust like cells pass on their DNA structure), content as it is edited and repurposed, can pass on its metadata of the above forms. Accordingly, core metadata generally should not be allowed to change, applied metadata generally should only be allowed to change if you have rights to do so, and contextual metadata can change based upon business requirements and usage, as long as rights are respected. Therefore, as new content is created, the metadata of the above is passed on from version to version.

For example, in the analog world, editing resulted in versions incurring generational quality loss, and metadata was just a piece of paper inside the tape box, usually with some "core metadata" and some operational data such as timing and position of breaks, to name a few. In a digital world, on the other hand, a mechanism can be created to ensure that all the metadata is passed along—this is the value of transacting business digitally—the content tells how it can be used. If one can automate that understanding, then significant business gains can be made. Also, one can do more valuable business decision making upstream in the business cycle, leaving downstream processes to be automated because they have the information needed.

This example is easily traced or trackable for a single piece of content that is being repurposed. There is additional complexity, however, when new content is made from other content. For example, multiple pieces of content, edited together to form a documentary or another short piece, or a promotion. Advantageously, embodiments of systems, program products, and methods of the present invention can allow content metadata to be combined to create new metadata, preserve core metadata, and respect the rights of the owners of the individual component pieces of content. Embodiments of systems, program products, and methods further address these issues by creating and determining content genealogy. These embodiments provide a combination of metadata "DNA" in such a way as to ensure that the "child" version, or the resultant content has all of the attributes of the parent components. To accomplish this, the relationship between two or more pieces of logical content can be tracked, showing metadata lineage—its genealogy, such as content predecessor, content successor, and inherited rights/rules using metadata.

Figure 2A:
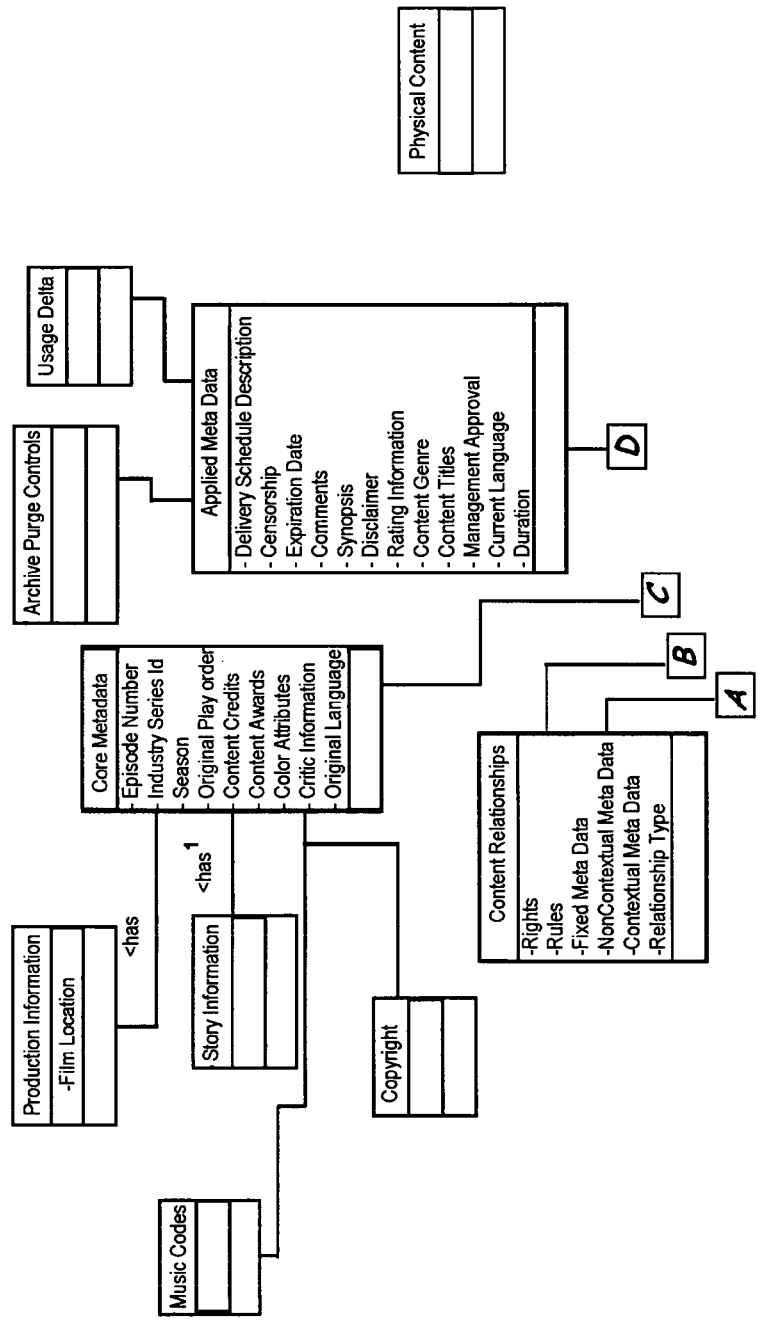
FIGS. 2A and 2B are a schematic diagram of an object model describing a mechanism to contain logical content and associated metadata according to an embodiment of the present invention.
Figure 2B:
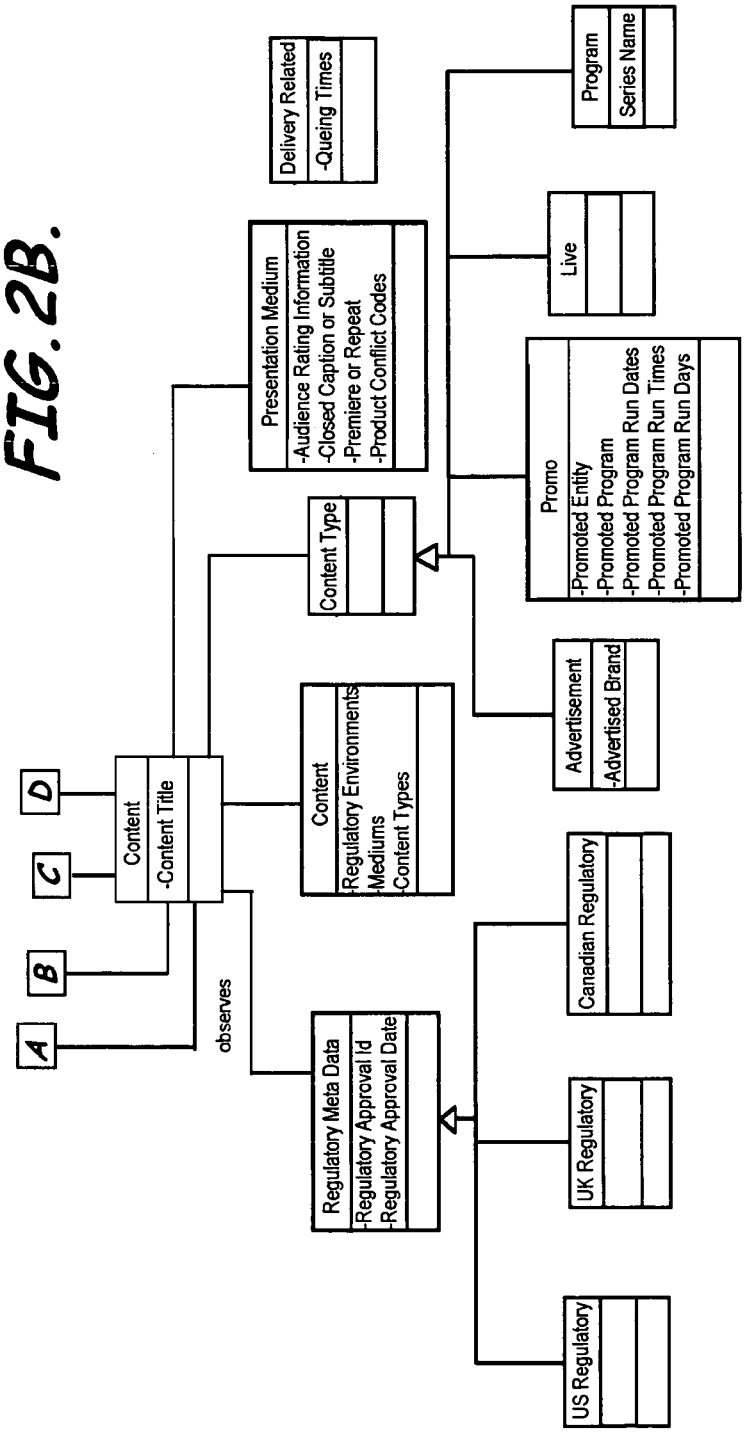

FIG. 2 illustrates an object model which describes the mechanism to contain this logical content and associated metadata and its relationship to the physical instantiation of a repository of media data referred to as content. The content includes content title. The content also includes core metadata which includes, for example, episode number, industry series id, original play order, contents credits, contents awards, color attributes, critic information, and original language. The core metadata is related to, for example, product information which includes film location, music codes, story information, and copyright. The content also includes applied metadata which can include, for example, delivery schedule description, censorship, expiration date, comments, synopsis, disclaimer, rating information, content genre, content titles, management approval, current language, and duration. The applied metadata is related to, for example, active purge controls and usage data. Active purge controls can provide instructions for removing data permanently without regard to further access of the data. Usage data is variable data, generated by the rights holder, and has attributes that identify usage and operational data.

The content can also include content relationship which includes, for example, rights, rules, fixed metadata, non-contextual metadata, contextual metadata, and relationship type. Note, contextual metadata is usage-specific data that provides required information for various environments (regulatory, medium, etc). It is the metadata that affects the ways in which logical content data is used. The content also includes regulatory metadata which can include regulatory approval ID and regulatory approval date and can be found in various regulations for a plurality of countries. The content can also include context which can include regulatory environments, mediums, and content types. The content can further include content type which can relate to advertisements including advertised brands, and can be related to promotions including the promoted entity, promoted program, promoted program run dates, promoted program runtimes, and promoted program run days. The content type can also be found in live media and program media which can include a series name. The content can further include presentation medium which can include audience rating information, closed caption or subtitle, premier or repeat, and product conflict codes. The content can also include delivery/related attributes such as cueing times.

Figure 3A:
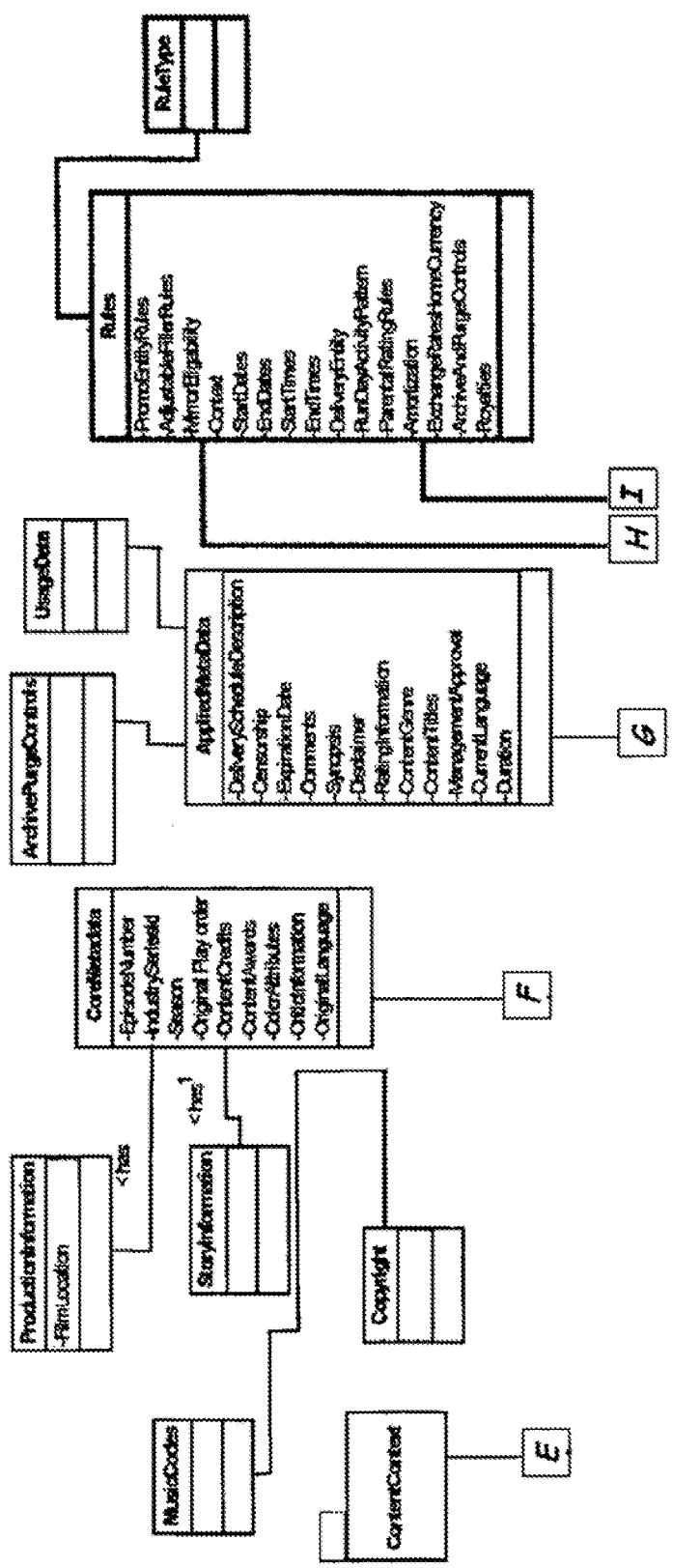

FIG. 3 also illustrates an object model, for example. The content includes content title. The content also includes core metadata which includes, for example, episode number, industry series ID, original play order, contents credits, contents awards, color attributes, critic information, and original language. The core metadata is related to, for example, product information which includes film location, music codes, story information, and copyright. The content also includes applied metadata which can include, for example, delivery schedule description, censorship, expiration date, comments, synopsis, disclaimer, rating information, content genre, content titles, management approval, current language, and duration. The applied metadata is related to, for example, active purge controls and usage data. The content also includes content relationship which includes, for example, rights, rules, fixed metadata, non-contextual metadata, contextual metadata, and relationship type. The content can also include rules which can, for example, include promoting entity rules, adjustable filler rules, mirror eligibility, context, start dates, end dates, start times, end times, delivery entity, run day/activity/pattern, parental rating rules, amortization, exchange rates home currency, archive and purge controls, and royalties. The content can also include rights which can include original owner, current rights holder, disposition of content essence, context, start dates, end dates, end time, run day/activity/pattern, delivery entity, promotion rating delivery guarantees, type of runs, run rights, payment adjustment information, payment schedule information, country rights, language rights, holds-active/inactive, music rights, options, distributor owner, and financial cost data. Note, essence includes the part of content that represents the information to be conveyed by the content, i.e., the part of content that joins with the physical aspects to create an object that can be utilized outside of software or program product.

The content can also include content grouping, which can include group type and group category. The content grouping can provide a mechanism used to group unrelated pieces of logical content together for financial or contractual reasons as well as to facilitate ease of entry, scheduling and tracking. Multiple grouping types can be created and then related to each other in a hierarchical structure. For example: content grouping types can include program, series year, and episode group types. The content can also include an edit decision list which can include data for providing, combining, and manipulating the "essence" such as, for example, EDL type, original content identifications, plays since last record, cut number, released for air, user bit location, comments, and "is actual" lists. The content can also include script line which provide the individual instructions for edit decision lists and which, for example, can include, sequence number, measure type-in measure x-value, in measure y-value, in measure z-value, context, segment number, actions, and "in container" instructions, and can relate to "effects" and media container. The media container, e.g., file, tape, or stream, and can include attributes such as, for example, house number, barcode, distributor number, physical media form, physical media inventory originator, physical media owner, physical media details, media return information, media receipt information, physical media disposition, comments, media usage, total plays for physical media, physical media inventory information, container directory, container source name, container source priority, destination priority, copy/timeout, update/timeout, expire/timeout, frame rate, encoding type, video bit rate, audio sample size, container host name, container host port, container node names, and asset ID. The media container is associated with a library location (current and home) which provides a placeholder thereof and which is associated with a library, i.e., room or server typically having one or more elaborate locations. The library can include library name and library usage rules attributes. The library location can include library location identification and barcode RFT values attributes and can provide a parent location for the media. The media container is associated with a container type and can have a borrower status which can include, for example, a checkout date, a due date, and comments, which can be associated with a domain.

As shown in FIG. 1, and as identified above, embodiments of the present invention can include a system 20 for providing such content management. More specifically, the system 20 can include a communication network 25 for transmitting media data and at least one computer accessible to the communication network to define a content management server 22. The content management server 22, for example, can have a processor and memory 24 coupled to the processor to store operating instructions therein. The system 20 also includes a database 80 accessible to the processor of the content management server 22 which can include media files associated with metadata records such as, for example, core metadata records, applied metadata records, and contextual metadata records.

The system 20 can also include a plurality of content management developer computers 28 each positioned remote from the content management server 22 and accessible to the communication network 25. Each content management developer computer 28 can have a processor, memory coupled to the processor to store operating instructions therein and to receive media files, a display in communication with the processor to display metadata, and a user interface in communication with the processor, to provide each of a corresponding plurality of content management developers with online access over the communication network 25 to the media files and associated metadata records to thereby, for example, generate code or content, develop and edit metadata rules and rights, establish content relationships, provide script line, define media containers, select a library and/or library location.

The system 20 can also include a plurality of user computers 26 each positioned at a respective plurality of user sites remote from the content management server 22 and accessible to the communication network 25 and having a processor and memory coupled to the processor to store operating instructions therein and to receive media files or other media data, a display in communication with the processor to display metadata associated with the media files or data, and a user interface in communication with the processor to provide the respective user with access to the media files over the communication network 25 to thereby view and edit at least portions of respective metadata records. Such users, often referred to as actors, can include various departments within various entities including, for example, the programming department, business department, sales department, traffic department, research department, and librarians (content storage department).

The system 20 can also include content management program product 30 stored in the memory of the content management server 22 to manage content and distribution of media. The content management program product 30 can be in the form of microcode, programs, routines, and symbolic languages that provide a specific set for sets of ordered operations that control the functioning of the hardware and direct its operation, as known and understood by those skilled in the art. The content management program product 30 can include instructions to perform the operations of receiving a metadata record for a media file responsive to user input to thereby associate metadata to the media file, receiving a request from a user to modify the metadata record for the media file, determining an identity of the user to thereby determine if the user has pre-established permissions, modifying the metadata record for the media file responsive to user input and responsive to determining the user has pre-established permissions, and providing current auditing of changes to the metadata. Advantageously, auditing of changes to the metadata can include tracking modified metadata fields with a date and time stamp and tracking deletions of portions of the metadata. The content management program product 30 can also include instructions to perform the operation of providing a parameter area within the form to create logical content settings for the metadata. Where the metadata is logical content metadata, the instructions to perform the operation of receiving the logical content metadata can further include importing the logical content metadata from a delivery-service provider.

According to embodiments of the present invention, the content management program product 30 can include instructions to perform the operation of creating one or more additional copies of the metadata record. Performing such operation can include receiving a request to access a copy function, providing a copy form including an input field for entering a number of copies, an input field for entering a numbering scheme, e.g., advance each copy by 1 or 0, and an input field for entering media attribute data, e.g., a title type for the copy such as episode, movie title, or production order, or, if desired, the field can be left blank. The operations can also include displaying the copy values selected by the user for review or modification by the user, and displaying a selection of the metadata value categories to copy. Each category value that will be copied can be displayed as the user selects the category. The copy value categories can include core metadata, applied metadata, contextual metadata, all metadata, relationships, physical, cross-references, and rules and rights, with the core category set, for example, as the default copy value. The relationships can include associative relationships, e.g., episodes and sequels, and genetic relationships, e.g., parent-child, grandparent-parent, and "kissing cousins."

According to an embodiment of the present invention, the core metadata category including core values is set such that it cannot be deselected, i.e., the core metadata category can be established to provide the minimum amount of that can/should be copied. The content management program product 30 can further include instructions to perform the operation of restricting access to values within each of value category so that the user can select all eligible values or no values. This prevents the user from time picking values to copy from within a category. For example, if the user selects a category, according to an embodiment of the present invention, all eligible values are displayed for the copy procedure. The selection however, allows the copying of all eligible or no values from within each category. Further, according to this embodiment of the present invention, the system 20 is not configured to allow copying identifying (key) values such as a material or media identification number which is utilized to make the record uniquely identifiable in the system 20. This field is copied as a blank and the user must enter the value(s) or create the value for each one of the copied records separately. Further, according to the preferred embodiment of the present invention, only eligible values in each selected category can be copied. For example, if the data is an original piece of content and is not being derived from one or more parents then there are no existing genetic relationships that can be copied. According to an embodiment, the system 20 can visually display ineligible categories differently, e.g., grayed out text to indicate an inactive status to indicate to the user that the category or categories cannot be selected to copy. Correspondingly, categories such as relationships, physical, cross-references, and rights-rules may or may not be selectable to be copied and thus, can be displayed as inactive if they are not relevant to a particular copy procedure. Further, the user may not be able to copy the genetic relationships subcategory.

According to an embodiment of the present invention, the system 20 and program product 30 form subcomponents of a .NET framework (FIG. 7) which can provide mechanisms for configuring and deploying an application from simple client/server to full n-tier distributed systems. Such framework can include distinct "blocks" (or blocks of software code or program product). These blocks can include media modules 81, media core 83, staging 85, and framework 87. The media modules 81 have been designed to provide functionality that can be optionally included. For example, an auditing module utilizes the agent module of the framework to implement auditing for the system. This module could be replaced with a client specific version of auditing if desired or not required. The media core 83 includes an application coordinator, Windows® UI, UI controls, UI coordinator, core services-scheduling, core services-content, core services-common, and domain modules which can provide various interface functions. The framework staging block 85 includes a user interface (UI) program, a messaging program, an agent program, and a searching program to allow the performance of various staging functions. The framework 87, for example, can be an Enterprise Framework that abstracts the technology underpinnings from the business of writing applications, thereby freeing application developers to focus on providing business solutions, not building technology to support the applications. Note, a more detailed description of the .Net framework according to various embodiments of the present invention can be found in U.S. Provisional Patent Application No. 60/712,052, by Bugir et al, titled "System, Program Product, and Methods to Enhance Media Content Management," filed on Aug. 29, 2005, and its corresponding U.S. Non-Provisional patent application Ser. No. 11/305,872 by Bugir et al, titled "System, Program Product, and Methods to Enhance Media Content Management" filed Dec. 16, 2005, both of which are incorporated herein by reference in their entireties.

As shown in FIGS. 1-7, embodiments of the present invention also include methods to manage content and distribution of media. For example, as shown in FIG. 4, according to an embodiment of the present invention, a method of determining media content genealogy includes the steps of identifying or characterizing each item of content in media as having both a physical instantiation and logical description (block 51), describing physical content by a plurality of types of metadata (block 52), creating new media content responsive to original media content having a predetermined source (block 53), and passing on metadata from the original media content to the new media content (block 54), with the metadata of the original media content having, for example, a plurality of types of pre-identified metadata. The method can also include tracking content of media responsive to each of the plurality of types of metadata (block 55), and determining the source of the original media content responsive to tracking of the plurality of types of metadata contained within the new media content (block 56). The method can also include characterizing the types of metadata and preserving metadata types responsive to preselected preservation instructions.

Figure 5:
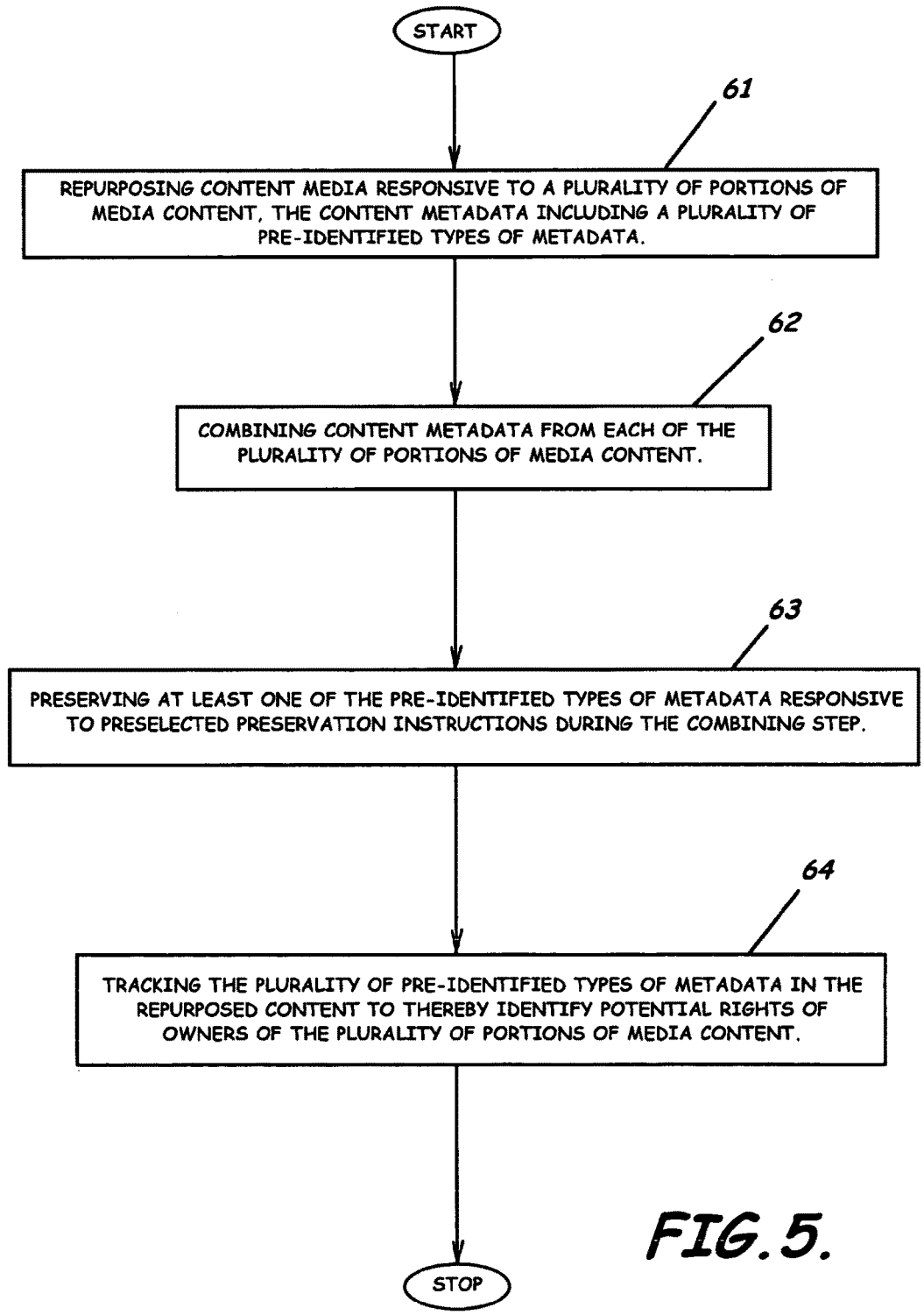
FIG. 5 is a flow diagram of a method of managing content and distribution of media according to an embodiment of the present invention.

According to another embodiment of the present invention, as shown in FIG. 5, a method of creating and tracking media content genealogy can include repurposing content media responsive to a plurality of portions of media content (block 61), the content metadata including a plurality of pre-identified types of metadata. The method can also include combining content metadata from each of the plurality of portions of media content (block 62), preserving at least one of the pre-identified types of metadata responsive to preselected preservation instructions during the combining step (block 63), and tracking the plurality of pre-identified types of metadata in the repurposed content to thereby identify potential rights of owners of the plurality of portions of media content (block 64).

Figure 6:
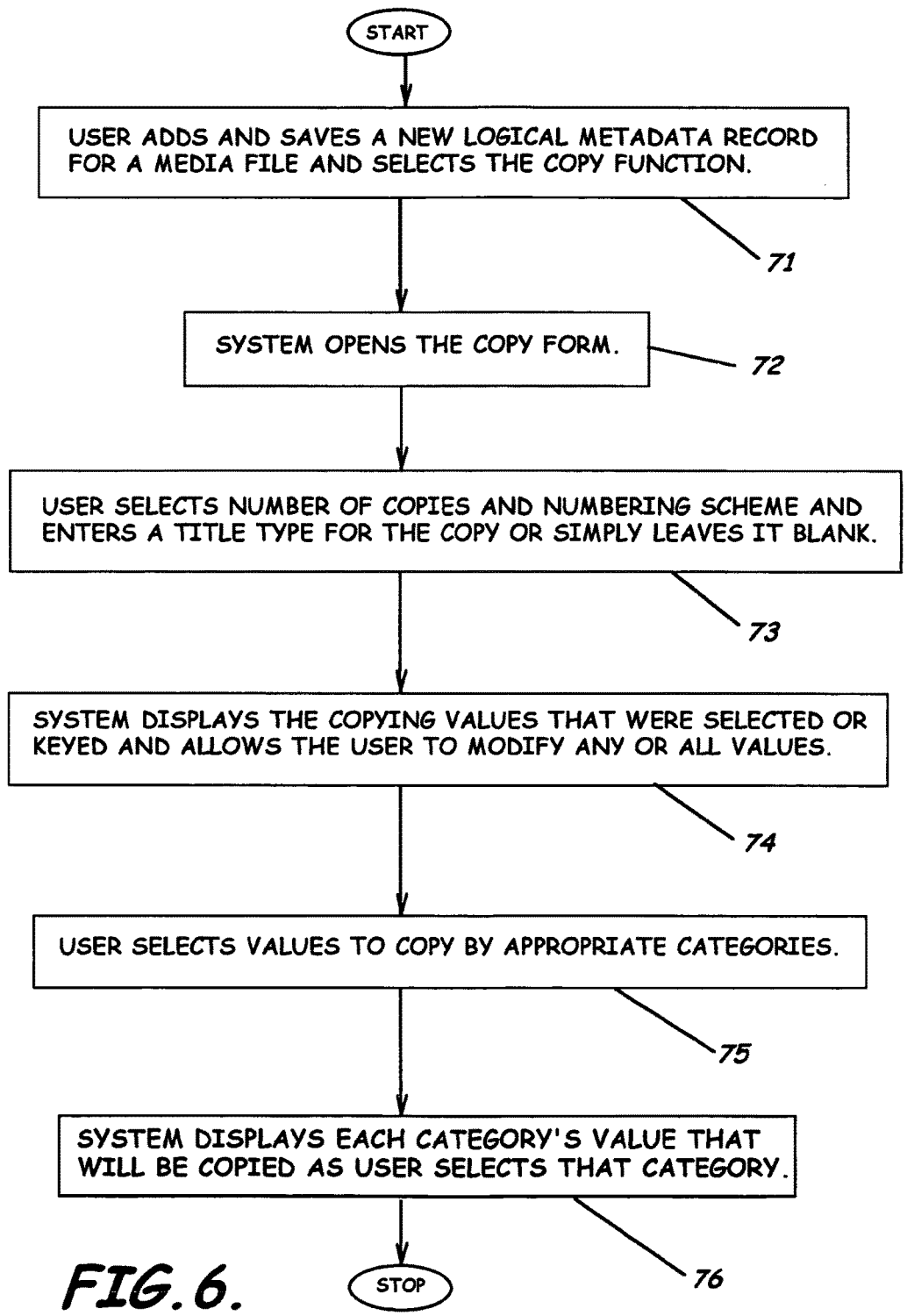
FIG. 6 is a flow diagram of a method of copying metadata according to an embodiment of the present invention.
Figure 7:
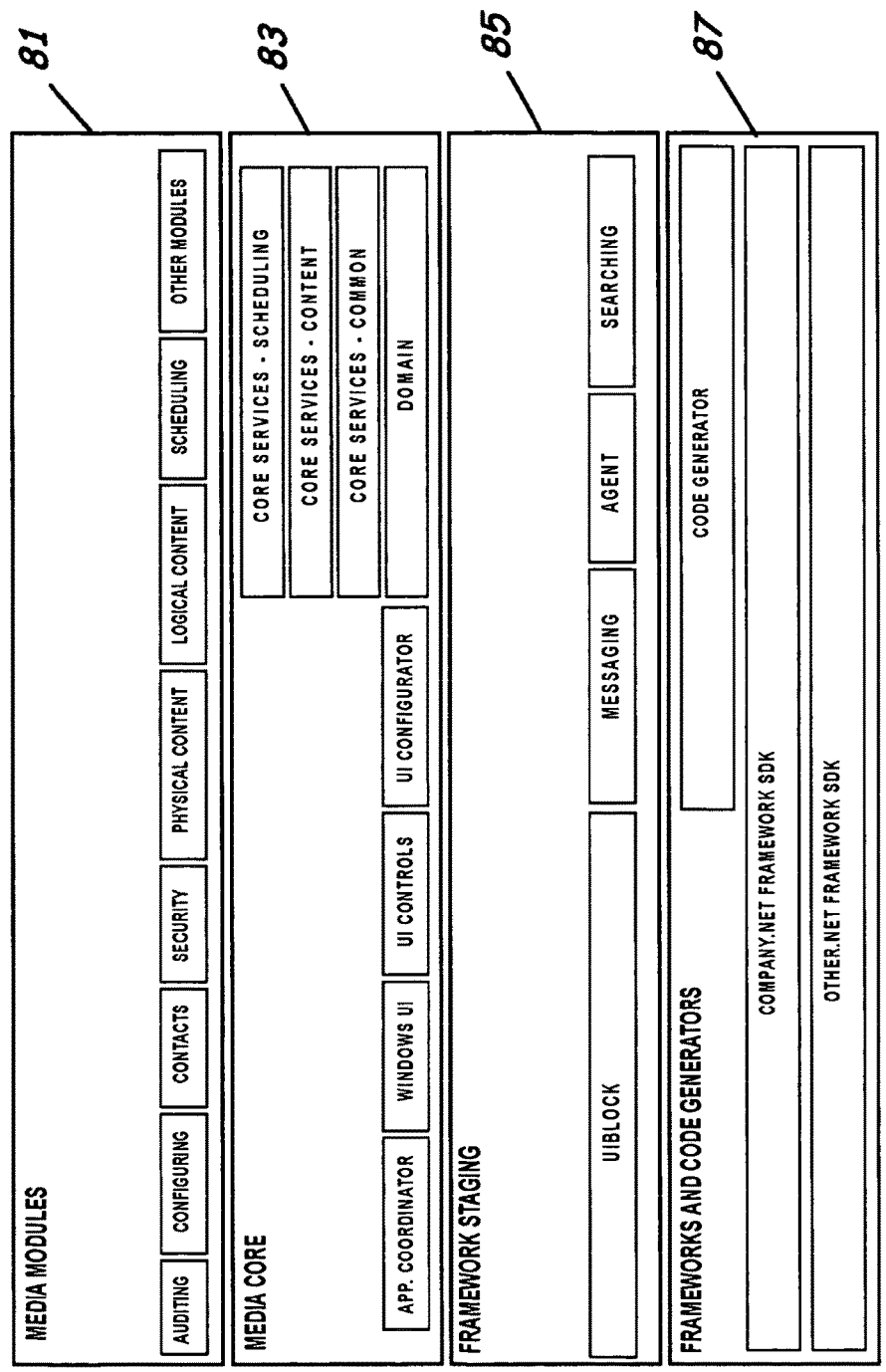
FIG. 7 is a schematic diagram illustrating a component nature of a framework of a system according to an embodiment of the present invention.

As shown in FIG. 6, according to another embodiment of the present invention, a method of managing media content can include creating one or more additional copies of the metadata record once the first one has been created (block 71) to save keystrokes. For example, a user adds and saves a new logical metadata record for a media file and selects the copy function. The system opens a copy form (block 72) including an input field for entering a number of copies, an input field for entering a numbering scheme, e.g., advance each copy by I or 0, and input field for entering media attribute data, e.g., a title type for the copy such as episode, movie title, production order, or the field can be left blank. The user selects a number of copies, e.g., thirteen, and numbering scheme, such as increment each copy by I or 0, and enters a title type for the copy such as episode, movie title, production order or simply leaves it blank (block 73). The system displays the copying values selected or keyed by the user for review or modification by the user (block 74), and displays a selection of the metadata value categories to copy. The user then selects values to copy by appropriate categories (block 75), and the system displays the category's values that will be copied as the user selects that category (block 76). The categories can include core metadata, applied metadata, contextual metadata, all metadata, relationships, physical, cross-references, and rules and rights, with the core category set as the default copy value. The relationships can include associative relationships, e.g., episodes and sequels, and genetic relationships, e.g., parent-child and "kissing cousins."

It is important to note that while embodiments of the present invention have been described in the context of a fully functional system those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs) or erasable, electrically programmable read only memories (EEPROMs), recordable type media such as floppy disks, hard disk drives, CD-ROMs, CD-R/RWs, DVD-ROMs, DVD-RAMs, DVD-R/RWs, DVD+R/RWs, flash drives, and other newer types of memories, and transmission type media such as digital and analog communication links. For example, such media can include both operating instructions and instructions related to the content management program product 30 and much of the method steps described above.

For example, as shown in FIGS. 1-7, embodiments of the present invention also include a computer readable medium that is readable by a computer to manage content and distribution of media. For example, according to an embodiment of the present invention, a computer readable medium that is readable by a computer managing content and distribution of media is provided. The computer readable medium can include a set of instructions that, when executed by the computer, cause the computer to perform the operations of receiving a metadata record for a media file responsive to user input to thereby associate metadata to the media file, receiving a request from a user to modify the metadata record for the media file, determining an identity of the user to thereby determine if the user has pre-established permissions, modifying the metadata record for the media file responsive to user input and responsive to determining the user has pre-established permissions, and providing current auditing of changes to the metadata. Providing auditing can further include the operations of tracking modified metadata fields with a date and time stamp, and tracking deletions of portions of the metadata. Further, the computer readable medium can include instructions to perform the operation of providing a parameter area within the form to create logical content settings for the metadata.

According to an embodiment of the present invention, the computer readable medium can also include instructions to perform the operation of creating one or more additional copies of the metadata record. Advantageously, this can be accomplished by performing the operations of receiving a request to access a copy function, providing a copy form including an input field for entering a number of copies, an input field for entering a numbering scheme, and input field for entering media attribute data, displaying the copy values selected by the user for review or modification by the user, and displaying a selection of the metadata value categories to copy.

According to an embodiment of the present invention, a computer readable medium that is readable by a computer managing content and distribution of media can include a set of instructions that, when executed by the computer, cause the computer to perform the operations of characterizing each item of content in media as having both a physical instantiation and logical description, describing physical content by a plurality of types of metadata, characterizing the types of metadata and preserving metadata types responsive to preselected preservation instruction, creating new media content responsive to original media content having a predetermined source, and passing on metadata from the original media content to the new media content, with the metadata of the original media content having a plurality of types of pre-identified metadata. The operations can also include tracking content of media responsive to each of the plurality of types of metadata, and determining the source of the original media content responsive to tracking of the plurality of types of metadata contained within the new media content.

According to an embodiment of the present invention, a computer readable medium that is readable by a computer managing content and distribution of media that can include a set of instructions that when executed by the computer cause the computer to perform the operations of repurposing content media responsive to a plurality of portions of media content, the content metadata including a plurality of pre-identified types of metadata, combining content metadata from each of the plurality of portions of media content, preserving at least one of the pre-identified types of metadata responsive to preselected preservation instructions during the combining step, and tracking the plurality of pre-identified types of metadata in the repurposed content to thereby identify potential rights of owners of the plurality of portions of media content.

Note this invention and this application relates to U.S. Provisional Patent Application No. 60/711,699, by Bugir et al, titled "System, Program Product, and Methods to Enhance Media Content Management," filed on Aug. 26, 2005, incorporated by reference herein in its entirety, U.S. Provisional Patent Application No. 60/715,664 by Bugir, et al., titled "System, Program, Product, and Methods to Enhance Media Content Management", filed on Sep. 8, 2005, incorporated herein by reference in its entirety, U.S. Non-Provisional patent application Ser. No. 11/305,870, by Bugir et al, titled "System, Program Product, and Methods to Enhance Media Content Management," filed on Dec. 16, 2005, incorporated by reference herein in its entirety, and U.S. Non-Provisional patent application Ser. No. 11/305,852 by Bugir, et al., titled "System, Program, Product, and Methods to Trace Content Genealogy", filed on Dec. 16, 2005, incorporated herein by reference in its entirety, and U.S. Non-Provisional patent application Ser. No. 11/305,872 by Bugir, et al., titled "System, Program, Product, and Methods to Enhance Media Content Management", filed on Dec. 16, 2005, incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

Having described the invention, the following is claimed:

1. A non-transitory computer-readable medium that is readable by a computer managing content and distribution of media, the computer readable medium comprising a set of instructions that, when executed by the computer, cause the computer to perform the following operations:
   receiving a metadata record for a media file responsive to a user input to thereby associate metadata to the media file;
   receiving a request from a user to modify the metadata record for the media file;

determining an identity of the user to thereby determine if the user has pre-established permissions to modify the metadata record;

modifying the metadata record for the media file responsive to user input and responsive to determining the user has the pre-established permissions;

providing current auditing of changes to the metadata;

receiving a request to access a copy function;

providing a copy form including an input field for entering a number of copies, an input field for entering a numbering scheme, and an input field for entering media attribute data;

displaying a selection of metadata value categories to copy; and displaying copy values from the copy form selected by the user for review or modification by the user.

2. The computer-readable medium as defined in claim 1, wherein the operation of providing current auditing of changes to the metadata further comprises:

tracking modified metadata fields with a date and time stamp; and tracking deletions of portions of the metadata.

3. The computer-readable medium as defined in claim 1, further comprising restricting access to values within the metadata value categories so that the user can select all eligible values or no values.

4. The computer-readable medium as defined in claim 3, wherein ineligible metadata value categories are displayed with an inactive status to indicate that the ineligible metadata value categories cannot be selected.

5. The computer-readable medium as defined in claim 1, wherein the metadata value categories include core metadata, applied metadata, contextual metadata, all metadata, relationships, physical, cross-references, and rules and rights.

6. The computer-readable medium as defined in claim 5, wherein the relationships comprise genetic relationships that include a parent-child relationship, a sibling relationship or a grandparent-grandchild relationship.

7. The computer-readable medium as defined in claim 5, wherein the relationships are associative relationships that include episodes and/or sequels.

8. The computer-readable medium of claim 1, wherein the metadata comprises logical content metadata, and where the medium further comprises instructions to perform the following operation:

providing a parameter area within a form to create logical content settings for the metadata.

9. The computer-readable medium of claim 8, further comprising instructions to perform the following operation:

importing the logical content metadata from a delivery-service provider.

10. The computer-readable medium of claim 1, further comprising instructions to perform the following operations:

repurposing content media, corresponding to at least one media file, responsive to a plurality of portions of media content, the repurposed content media including a plurality of pre-identified types of the metadata;

combining content metadata from each of the plurality of portions of media content;

preserving at least one of the plurality of pre-identified types of metadata responsive to preselected preservation instructions during the combining operation; and tracking the plurality of pre-identified types of metadata in the repurposed content media to thereby identify potential rights of owners of the plurality of portions of media content.

11. A non-transitory computer-readable medium that is readable by a computer for managing content and distribution of media, the readable medium comprising a set of instructions that, when executed by the computer, cause the computer to perform the following operations:

repurposing content media responsive to a plurality of portions of media content, the repurposed content media including a plurality of pre-identified types of metadata;

combining content metadata from each of the plurality of portions of media content;

preserving at least one of the plurality of pre-identified types of metadata responsive to preselected preservation instructions during the combining operation;

tracking the plurality of pre-identified types of metadata in the repurposed content media to thereby identify potential rights of owners of the plurality of portions of media content; and creating one or more additional copies of a metadata record for a media file by performing the following operations:

receiving a request to access a copy function;

providing a copy form including an input field for entering a number of copies, an input field for entering a number scheme, and an input field for entering media attribute data;

displaying a selection of metadata value categories to copy; and displaying the copy values selected by the user for review or modification by the user.

12. The computer-readable medium as defined in claim 11, further comprising instructions to perform the following operation:

providing a parameter area within a form to create logical content settings for the content metadata.

13. The computer-readable medium as defined in claim 11, further comprising instructions to perform the operation of providing auditing of changes to the content metadata by performing the following operations:

tracking modified metadata fields with a date and time stamp; and tracking deletions of portions of the content metadata.

14. The computer-readable medium as defined in claim 11, further comprising instructions to perform the operation of restricting access to values within the metadata value categories so that the user can select all eligible values or no values.

15. The computer-readable medium as defined in claim 14, wherein ineligible metadata value categories are displayed with an inactive status to indicate that the ineligible metadata value categories cannot be selected.

16. The computer-readable medium as defined in claim 15, wherein the metadata value categories include core metadata, applied metadata, contextual metadata, all metadata, relationships, physical, cross-references, and rules and rights.

17. The computer-readable medium as defined in claim 16, wherein the relationships are genetic relationships that include a parent-child relationship, a sibling relationship or a grandparent-grandchild relationship.

18. The computer-readable medium as defined in claim 11, further comprising instructions to perform the following operations:

receiving a metadata record for the media content responsive to a user input to thereby associate metadata to the media content;

receiving a request from a user to modify the metadata record for the media content;

determining an identity of the user to thereby determine if the user has pre-established permissions to modify the metadata record;

modifying the metadata record for the media file responsive to user input and responsive to determining the user has the pre-established permissions; and providing current auditing of changes to the metadata.

19. The computer-readable medium as defined in claim 18, wherein the operation of providing current auditing of changes to the metadata further comprises:

tracking modified metadata fields with a date and time stamp; and tracking deletions of portions of the metadata.

* * * * *